(12) United States Patent
Hiatt, Jr.

(10) Patent No.: US 8,140,425 B2
(45) Date of Patent: Mar. 20, 2012

(54) METHOD AND SYSTEM FOR GENERATING AND TRADING DERIVATIVE INVESTMENT INSTRUMENTS BASED ON A VOLATILITY ARBITRAGE BENCHMARK INDEX

(75) Inventor: John C. Hiatt, Jr., Woodridge, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 777 days.

(21) Appl. No.: 11/875,572

(22) Filed: Oct. 19, 2007

(65) Prior Publication Data

US 2008/0154790 A1    Jun. 26, 2008

Related U.S. Application Data

(60) Provisional application No. 60/859,619, filed on Nov. 13, 2006.

(51) Int. Cl.
*G06Q 40/00* (2012.01)
(52) U.S. Cl. .......................... 705/37; 705/35; 705/36 R
(58) Field of Classification Search ................. 705/37, 705/36 R
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |
| 5,136,501 A | 8/1992 | Silverman et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,315,634 A | 5/1994 | Tanaka et al. |
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |

(Continued)

FOREIGN PATENT DOCUMENTS

EP    0 752 135    2/1999

(Continued)

OTHER PUBLICATIONS

William J Brodsky. (Sep. 2004). Choice Tools. Barron's, 84(37), MW13. Retrieved Nov. 11, 2011.*

(Continued)

*Primary Examiner* — Narayanswamy Subramanian
*Assistant Examiner* — Kito R Robinson
(74) *Attorney, Agent, or Firm* — Brinks Hofer Gilson & Lione (57) ABSTRACT

A system and method for creating a volatility arbitrage bench mark index is disclosed. The method includes obtaining closing prices of an underlying instrument, such as a derivative investment instrument, and calculating a value representing a volatility arbitrage benchmark. The value may be displayed at a trading facility and volatility arbitrage benchmark quotes may be transmitted by the trading facility to a market participant.

3 Claims, 3 Drawing Sheets

U.S. PATENT DOCUMENTS

| | | | |
|---|---|---|---|
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Spepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,103,569 B1 * | 9/2006 | Groveman et al. ............. 705/35 |
| 7,225,153 B2 | 5/2007 | Lange |
| 7,233,922 B2 | 6/2007 | Asher et al. |
| 7,236,953 B1 | 6/2007 | Cooper et al. |
| 7,246,093 B1 | 7/2007 | Katz |
| 7,260,554 B2 | 8/2007 | Morano et al. |
| 7,296,025 B2 | 11/2007 | Kung et al. |
| 7,328,184 B1 | 2/2008 | Krause |
| 7,333,950 B2 | 2/2008 | Shidler et al. |
| 7,389,264 B2 | 6/2008 | Kemp, II et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel et al. |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0093356 A1 * | 5/2003 | Kaufman ........................ 705/37 |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith et al. |
| 2004/0236636 A1 | 11/2004 | Lutnick et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0097027 A1 | 5/2005 | Kavanaugh |
| 2005/0102214 A1 | 5/2005 | Speth et al. |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2006/0008016 A1 | 1/2006 | Balakrishnan et al. |
| 2006/0036531 A1 | 2/2006 | Jackson et al. |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2007/0011081 A1 | 1/2007 | Bok et al. |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0172352 A1 | 7/2007 | Chiang |
| 2007/0282758 A1 | 12/2007 | Vischer et al. |
| 2008/0059356 A1 * | 3/2008 | Brodsky et al. .................. 705/37 |
| 2008/0065560 A1 | 3/2008 | Bloom |
| 2008/0120249 A1 | 5/2008 | Hiatt |
| 2008/0120250 A1 | 5/2008 | Hiatt, Jr. |
| 2008/0154790 A1 | 6/2008 | Hiatt |
| 2008/0183640 A1 | 7/2008 | Shalen |
| 2008/0243676 A1 | 10/2008 | Smith |

| | | | |
|---|---|---|---|
| 2009/0063362 | A1 | 3/2009 | O'Connell et al. |
| 2009/0063364 | A1 | 3/2009 | O'Connell et al. |
| 2009/0182684 | A1 | 7/2009 | Shalen |
| 2009/0222372 | A1 | 9/2009 | Hiatt, Jr. |
| 2010/0005032 | A1* | 1/2010 | Whaley et al. ............ 705/36 R |
| 2010/0042531 | A1* | 2/2010 | Heaton et al. ................ 705/37 |
| 2010/0257118 | A1 | 10/2010 | Speth et al. |

FOREIGN PATENT DOCUMENTS

| | | |
|---|---|---|
| EP | 0 952 536 A1 | 10/1999 |
| WO | 00/28449 | 5/2000 |
| WO | 00/48053 | 8/2000 |
| WO | 00/57307 A1 | 9/2000 |
| WO | 00/70506 | 11/2000 |
| WO | 01/22263 | 3/2001 |
| WO | 01/22269 | 3/2001 |
| WO | 01/22313 | 3/2001 |
| WO | 01/22315 | 3/2001 |
| WO | 01/22332 | 3/2001 |
| WO | 01/88808 | 11/2001 |
| WO | 02/37396 A2 | 5/2002 |
| WO | 02/077766 A2 | 10/2002 |

OTHER PUBLICATIONS

A. Frino et al., The Liquidity of Automated Exchanges: New Evidence From Germany Bund Futures, vol. 8, Journal of International Financial Markets, Institutions and Money, pp. 225-241 (1998).

Angel, James J., "How Best to Supply Liquidity to a Small-Capitalization Securities Market", Georgetown University, Jul. 15, 1996, 27 pages.

Blahnik, Mike, "Internet Opens Up Trading Frontiers", Star Tribune, Metro Edition, Minneapolis, MN, Retrieved from: http://web.archive.org/web/20040322223904/http://www.intrade.com/, dated Jul. 25, 2004.

Bogomolny, Laura,: Wanna Make a Bet?, Canadian Business, Toronto, vol. 77, Iss. 21, Oct. 25 to Nov. 7, 2004.

Bounds for a Volume Weighted Average Price Option, A. W. Stace, Sep. 24, 2004.

CBOE Futures Exchange letter dated May 17, 2004, to Commodity Futures Trading Commission with accompanying pages containing rules, terms, and conditions for a new product to be traded on the CBOE Futures change, 8 pages.

Chicago Board of Options Exchange, Inc. Description of the CBOE S & P 500 BuyWrite Index (BXM$^{SM}$), 5 pages, 2004.

Chicago Board of Options Exchange, Inc. The New CBOE Volatility Index, 19 pages, 2003.

Clemens et al., "Segmentation, differentiation, and flexible pricing: Experiences with information technology and segment-tailored strategies", Journal of Management Information Systems: JMIS, vol. 11, No. 2, pp. 9-36, Fall 1994.

Demeterfi, Kresimir, et al., "More Than You Ever Wanted to Know About Volatility Swaps," Goldman Sachs Quantitative Strategies Research Notes, Mar. 1999.

Devire (Jay L. Devore, "Probability and Statistics for Engineering and the Sciences, Second Edition", Published 1987 by Wadsworth, Inc., pp. 13-16 and 86-96).

Duffie, D. and Huang, M., "Swap Rates and Credit Quality", Mar. 31, 1995.

E. Clemons et al., "Information Technology and Screen-Based Securities Trading: Pricing the Stock and Pricing the Trade", Management Science, vol. 43, No. 12, Dec. 1997.

Hull, J. and White, A., "The Valuation of Credit Default Swap Options", Journal of Derivatives, vol. 10, No. 3, 2003, p. 40.

Morgan Stanley, "Global Medium-Term Notes, series F", Registration statement No. 333-117752, Securities Commission and Exchange, 2004, pp. 22-26.

Notice of Receipt of Plan Filed Pursuant to Section 11A(a)(3)(B) of the Securities Exchange Act of 1934, 1980 WL 29398, SEC Release No. 34-16519, Jan. 22, 1980, 7 pages.

Original Rule Filing and Amendment No. 1 to SR-CBOE-2002-05, Submitted to SEC on Jan. 16, 2002, 17 pages.

PCX Plus The Pacific Exchange, PCX Plus Overview, Oct. 9, 2003, six pages.

Press Release article, "CBOE Announces Launch of Futures on VIX: First Tradable Volatility Product Will be Offered on New CBOE Futures Exchange," Sep. 5, 2003, two pages.

Raithel, Tom, article titled "Major Changes Seen for Exchanges", Evansville Courier and Press, Apr. 12, 2000, p. B.6.

S. Cosgrove, "Courting Retail, Institutional Customers, CBOE, AMEX Get Creative", Knight-Ridder Financial News, Jan. 29, 1993.

"smartRay.com Delivers Stock Quotes and Financial Information to Wireless Devices for Free !", PR Newswire, p. 2870, Dec. 16, 1999.

Sodergreen, John, "Product profile: Economic Derivatives in the Energy Sector", Futures Industry Magazine, Jan.-Feb. 2005 issue, retrieved from http://www.futuresindustry/org/fi-magazine-home.asp?v=p&q=1018 on May 20, 2008.

Sulima, Cheryl, "Volatility and Variance Swaps", Capital Markets News, Federal Reserve Bank of Chicago, Mar. 2001.

The Chicago Board Option Exchange, Exchange Bulletin dated Mar. 13, 1991, vol. 19, No. 11.

"The Electronic Component", The Options Institute Online Learning Center, obtained at the internet address: htto://www.cdoe.com/LearnCenter/cboeeducation/Course_02_02/mod_02_03.html.

"The Pandora's Box over autoquotes; Industry Trend or Event", Wall Street & Technology, Section No. 3, vol. 13, p. 38; ISSN: 1060-989X, Mar. 1997.

Transitions 1-3, Transitions Trading website, retrieved using: www.archive.org Jul. 29, 2004 and Dec. 11, 2004.

Vasiliki D. Skintzi, "Implied correlation index: A new measure of diversification", The Journal of Future Markets, Feb 2005, vol. 25, Iss. 2, pp. 1-3.

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.

Whaley, Robert. "Return and Rick of CBOE Buy Write Monthly Index", The Journal of Derivatives, 2002, pp. 35-42.

* cited by examiner

METHOD AND SYSTEM FOR GENERATING AND TRADING DERIVATIVE INVESTMENT INSTRUMENTS BASED ON A VOLATILITY ARBITRAGE BENCHMARK INDEX

CROSS-REFERENCE TO RELATED APPLICATIONS

This application claims the benefit of U.S. Provisional Application No. 60/858,619, filed Nov. 13, 2006, the entirety of which is incorporated herein by reference.

TECHNICAL FIELD

The present invention relates generally to financial trading systems and more particularly to the generation, identification, processing, trading, quotation, and valuation of volatility arbitrage benchmark indices and related derivative investment instruments.

BACKGROUND

An index is a statistical composite that is used to indicate the performance of a market or a market sector over various time periods. Examples of indices that are used to gauge the performance of stocks and other securities in the United States include the Dow Jones Industrial Average, the National Association of Securities Dealers Automated Quotations (NASDAQ) Composite Index, the New York Stock Exchange Composite Index, etc. In general, the Dow Jones Industrial Average contains thirty (30) stocks that trade on the New York Stock Exchange as well as NASDAQ, and is a general indicator of how shares of the largest United States companies are trading. The NASDAQ Composite Index is a composite index of more than three thousand (3,000) companies listed on the NASDAQ (also referred to as over-the-counter or OTC stocks). It is designed to indicate the stock performance of small-cap and technology stocks. Finally, the New York Stock Exchange Composite Index is a composite index of shares listed on the New York Stock Exchange.

In equal-dollar weighted indices, the weights of each component are reset to equal values at regular intervals, such as for example, every quarter. Between re-adjustments, the weights of the various index components will deviate from the equal-dollar weighting values as the values of the components fluctuate. Periodically, indices must be adjusted in order to reflect changes in the component companies comprising the index, or to maintain the original intent of the index in view of changing conditions in the market. For example, if a component stock's weight drops below an arbitrary threshold, or if a component company significantly alters its line of business or is taken over by another company so that it no longer represents the type of company which the index is intended to track, the index may no longer be influenced by, or reflect the aspects of the market for which it was originally designed. In such cases it may be necessary to replace a component stock with a suitable replacement stock. If a suitable replacement that preserves the basic character of the index cannot be found, the stock may simply be dropped without adding a replacement. Conversely, activity in the market for which an index is created may dictate that a new stock (which was not originally included in the index) having a strong impact in the market be added to the index to adequately reflect the market without eliminating other components. In each case, the divisor may be adjusted so that the index remains at the same level immediately after the new stock is added or the old stock is eliminated.

Derivatives are financial securities whose values are derived in part from a value or characteristic of some other underlying asset or variable (the underlying asset). The underlying asset may include securities such as stocks, market indicators and indices, interest rate, and corporate debt, such as bonds, to name but a few. Two common forms of derivatives are options contracts and futures contracts, discussed herein below.

An option is a contract giving the holder of the option the right, but not the obligation, to buy or sell an underlying asset at a specific price on or before a certain date. Generally, a party who purchases an option is said to have taken a long position with respect to the option. The party who sells the option is said to have taken a short position. There are generally two types of options: calls and puts. An investor who has taken a long position in a call option has bought the right to purchase the underlying asset at a specific price, known as the "strike price." If the long investor chooses to exercise the call option, the long investor pays the strike price to the short investor, and the short investor is obligated to deliver the underlying asset.

Alternatively, an investor who has taken a long position in a put option receives the right, but not the obligation to sell the underlying asset at a specified price, again referred to as the strike price on or before a specified date. If the long investor chooses to exercise the put option, the short investor is obligated to purchase the underlying asset from the long investor at the agreed upon strike price. The long investor must then deliver the underlying asset to the short investor. Thus, the traditional settlement process for option contracts involves the transfer of funds from the purchaser of the underlying asset to the seller, and the transfer of the underlying asset from the seller of the underlying asset to the purchaser. Cash settlement, however, is more common. Cash settlement allows options contracts to be settled without actually transferring the underlying asset.

A call option is "in-the-money" when the price or value of the underlying asset rises above the strike price of the option. A put option is "in-the-money" when the price or value of the underlying asset falls below the strike price of the option. An at-the-money option wherein the price or value of the underlying asset is equal to the strike price of the option. A call option is out-of-the-money when the price or value of the underlying asset is below the strike price. A put option is out-of-the-money when the price or value of the underlying asset is above the strike price. If an option expires at-the-money or out-of-the-money, it has no value. The short investor retains the amount paid by the long investor (the option price) and pays nothing to the long investor. Cash settlement of an in-the-money option, be it a call or a put, however, requires the short investor to pay to the long investor the difference between the strike price and the current market value of the underlying asset.

Cash settlement allows options to be based on more abstract underlying "assets" such as market indicators, stock indices, interest rates, futures contracts and other derivatives. For example, an investor may take a long position in a market index call option. In this case, the long investor receives the right to "purchase" not the index itself, but rather a cash amount equal to the value of the index (typically multiplied by a multiplier) at a specified strike value. An index call option is in-the-money when the value of the index rises above the strike value. When the holder of an in-the-money index call option exercises the option, the short investor on the opposite side of the contract is obligated to pay the long investor the difference between the current value of the index and the strike price, usually multiplied by the multiplier. If the current value of the index is less than or equal to the strike value, the option has no value. An index put option works in the same way but in reverse, having value, or being in-the-money when the value of the index falls below the strike value.

Futures contracts are another common derivative security. In a futures contract a buyer purchases the right to receive delivery of an underlying commodity or asset on a specified date in the future. Conversely, a seller agrees to deliver the commodity or asset to an agreed location on the specified date. Futures contracts originally developed in the trade of agricultural commodities, but quickly spread to other commodities as well. Because futures contracts establish a price for the underlying commodity in advance of the date on which the commodity must be delivered, subsequent changes in the price of the underlying asset will inure to the benefit of one party and to the detriment of the other. If the price rises above the futures price, the seller is obligated to deliver the commodity at the lower agreed upon price. The buyer may then resell the received product at the higher market price to realize a profit. The seller in effect loses the difference between the futures contract price and the market price on the date the goods are delivered. Conversely if the price of the underlying commodity falls below the futures price, the seller can obtain the commodity at the lower market price for delivery to the buyer while retaining the higher futures price. In this case the seller realizes a profit in the amount of the difference between the current market price on the delivery date and the futures contract price. The buyer sees an equivalent loss.

Like options contracts, futures contracts may be settled in cash. Rather than actually delivering the underlying asset, cash settlement merely requires payment of the difference between the market price of the underlying commodity or asset on the delivery date and the futures contract price. The difference between the market price and the futures price is to be paid by the short investor to the long investor, or by the long investor to the short investor, depending on which direction the market price has moved. If the prevailing market price is higher than the contract price, the short investor must pay the difference to the long investor. If the market price has fallen, the long investor must pay the difference to the short investor.

Again, like options, cash settlement allows futures contracts to be written against more abstract underlying "assets" or "commodities," such as market indicators, stock indices, interest rates, futures contracts and other derivatives. For example, an investor may take a long position in a market index futures contract. In this case, the long investor "buys" the index at a specified futures price (i.e. a future value of the index on the "delivery" date). The index based futures contract is cash settled. One party to the contract pays the difference between the futures price and the actual value of the index (often multiplied by a specified multiplier) to the other investor depending on which direction the market has moved. If the value of the index has moved above the futures price, or futures value, the short investor pays the difference the long investor. If the value of the index has moved below the futures price, or futures value the long investor pays the difference to the short investor.

Cash settlement provides great flexibility regarding the types of underlying assets that derivative investment instruments may be built around. Essentially any variable whose value is subject to change over time, may serve as the underlying asset for a derivative investment instrument. While standard derivatives may be based on many different underlying assets, no index or derivative investment instruments based thereon exist that capture changes in the performance of total return volatility index.

BRIEF SUMMARY

In order to address the need for improvements on derivative investment instruments, total return volatility index derivative investment instruments and methods for creating a total return volatility index are disclosed herein based on changes in the performance of periodically selling a realized volatility derivatives contract.

According to a first aspect of the disclosure, a computer-readable medium containing processor executable program instructions for creating a volatility arbitrage benchmark index is disclosed including obtaining the daily closing prices of a derivative investment instrument since an inception date, calculating a value reflecting a volatility arbitrage benchmark for the derivative investment instrument, and wherein a value reflecting a volatility arbitrage benchmark is calculated according to the formula:

$$Index_t = Index_{t-1} \times \left[1 + \left(\frac{\sqrt{p_t} - \sqrt{p_{t-1}}}{\sqrt{p_{t-1}}}\right)\right]$$

where $Index_t$ is a first time period closing index value; $Index_{t-1}$ is a second time period closing index value; $p_t$ is a first time period closing price for a front-month derivative investment instrument; and $p_{t-1}$ is a second time period closing price for the front-month derivative investment instrument.

In a second aspect, the invention relates to a computer-readable medium containing processor executable program instructions for creating a volatility arbitrage benchmark index is disclosed including obtaining the daily closing prices of a derivative investment instrument since an inception date, calculating a value reflecting a volatility arbitrage benchmark for the derivative investment instrument, and wherein a value reflecting a volatility arbitrage benchmark is calculated according to the formula:

$$Index_t = Index_i \times \left[1 + \left(\frac{\sqrt{p_t} - \sqrt{p_i}}{\sqrt{p_i}}\right)\right]$$

where $Index_i$ is an initial time period closing index value; $Index_t$ is a post-initial time period closing index value; $p_i$ is an initial time period closing price for the front-month derivative investment instrument; and $p_t$ is a post-initial time period closing price for a front-month derivative investment instrument.

In a third aspect, the invention relates to a method for calculating a volatility arbitrage benchmark index value, the method including calculating a value reflecting a volatility arbitrage benchmark of an underlying asset on a processor, the value for the total volatility having a dynamic value which reflects a performance of the underlying asset over a pre-defined time period, displaying at least one value reflecting the total volatility of the underlying asset on a trading facility display device coupled to a trading platform, and transmitting at least one volatility arbitrage benchmark derivative quote of a liquidity provider from the trading facility to at least one market participant.

In a fourth aspect, the invention relates to a system for creating and trading derivatives based on a volatility arbitrage benchmark index module coupled with a communications network for receiving current values of an underlying asset of a derivative investment instrument and calculating a volatility arbitrage benchmark of the underlying asset, a dissemination module coupled with the volatility arbitrage benchmark index module and the communications network for receiving the volatility arbitrage benchmark of the underlying asset from the volatility arbitrage benchmark index module, and disseminating the value of the volatility arbitrage benchmark of the underlying asset to at least one market participant, and a trading module coupled with the dissemination module and the communications network for receiving at least one buy or sell order for the derivative investment instrument, and executing the at least one buy or sell order.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
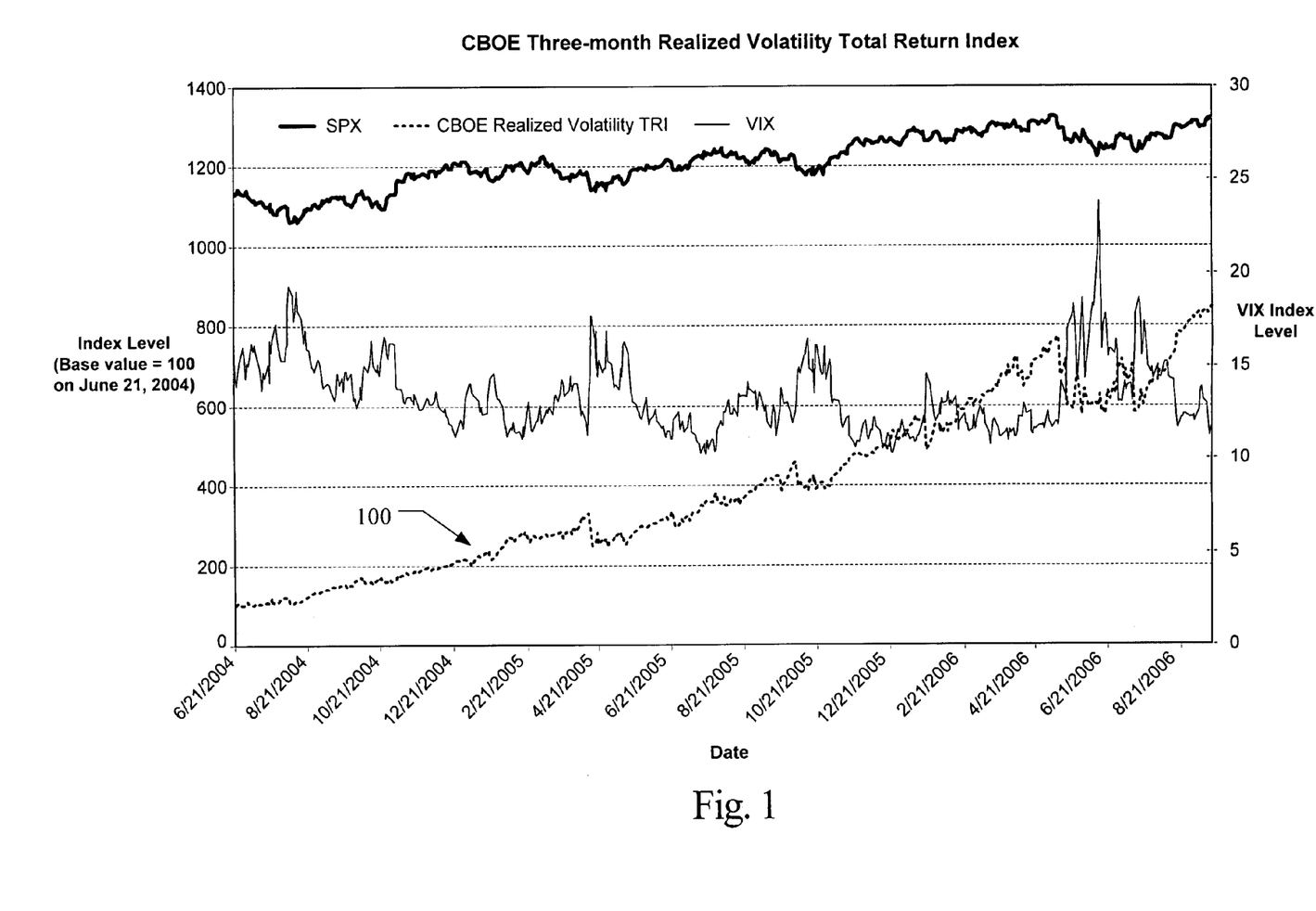
FIG. 1 is a graph illustrating one embodiment of an example volatility arbitrage benchmark index that calculates a value of performance of periodically selling a volatility derivative investment instrument.

Referring now to FIG. 1, a volatility arbitrage benchmark index 100 is illustrated that is designed to reflect and replicate the performance of periodically selling a realized volatility derivative investment instrument, such as a three-month Standard & Poor's® ("S&P") 500 index (ticker symbol "SPX") realized volatility swap/futures contract. The volatility arbitrage benchmark index would be periodically disseminated, for example, every 15 seconds and would serve as the underlying for a derivative investment instrument (such as an option or futures contract). The use of a derivative investment instrument that tracks a volatility arbitrage benchmark index disseminated by an exchange, such as the Chicago Board Options Exchange®, 400 South LaSalle Street, Chicago, Ill. 60605 ("CBOE"), is beneficial to the creation/redemption process.

The creation of a volatility arbitrage benchmark index would facilitate development of volatility-based exchange-traded products, such as an exchange-traded fund (ETF). An ETF is typically an index fund that is not actively managed that may hold securities, currencies, commodities and other financial assets. Shares of an ETF are traded on a securities exchange. The traded price of these shares tracks their net asset value through the use of a creation/redemption process, which permits arbitrage. This creation/redemption process and the need for a more active management process are two of the impediments for a volatility-based ETF.

In order to overcome the aforementioned limitations, the construction of the volatility arbitrage benchmark index utilizes the daily closing prices of a standardized derivative investment instrument, such as, by way of example below, the CBOE S&P 500 Three-month Realized Variance futures contract. The total return volatility index includes an index base date and the base value (for example, 100). Other standardized derivative investment instruments, such as realized volatility futures and options are contemplated for use in connection with the volatility arbitrage benchmark.

Example Index Calculation 1

The daily index value for the volatility arbitrage benchmark index in this example is calculated according to the following formula:

$$Index_t = Index_{t-1} \times \left[1 + \left(\frac{\sqrt{p_t} - \sqrt{p_{t-1}}}{\sqrt{p_{t-1}}}\right)\right]$$

where,
$Index_{t-1}$=Today's closing index value.
$Index_{t-1}$=Yesterday's closing index value.
$p_t$=Today's closing price for the front-month CBOE S&P 500 Three-month Realized Variance future.
$p_{t-1}$=Yesterday's closing price for the front-month CBOE S&P 500 Three-month Realized Variance future.

Example Index Calculation 2

The daily index value for the volatility arbitrage benchmark index in this example is calculated according to the following formula:

$$Index_t = Index_i \times \left[1 + \left(\frac{\sqrt{p_t} - \sqrt{p_i}}{\sqrt{p_i}}\right)\right]$$

where,
$Index_i$=Initial closing index value.
$Index_t$=Today's closing index value.
$p_i$=Initial closing price for the front-month CBOE S&P 500 Three-month Realized Variance future.
$p_t$=Today's closing price for the front-month CBOE S&P 500 Three-month Realized Variance future.

In a further alternative embodiment in accordance with the principles of the present invention, the volatility arbitrage benchmark index could be employed as a gauge against which a particular portfolio manager's performance can be measured. In another embodiment, an exchange-traded fund could be designed to reflect a portfolio that invests in Dow Jones Industrials Average index stocks. In still yet another embodiment, $p_i$ and $p_t$ may be representative of any derivative investment instrument, including but not limited to futures and options. Additionally, it is contemplated that the volatility arbitrage benchmark index is capable for utilization in both settlement and roll processes for standardized derivative investment instruments.

Figure 2:
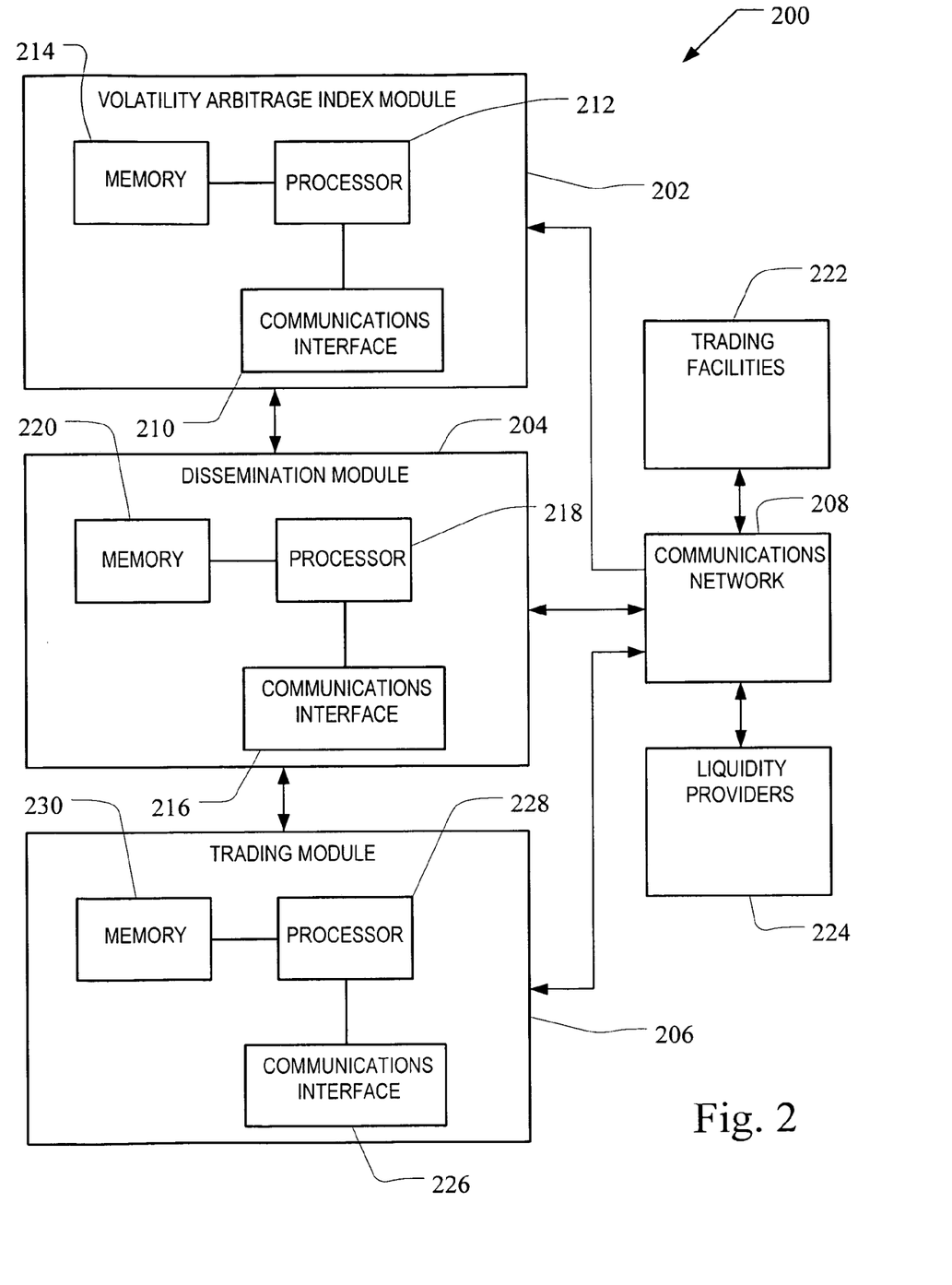
FIG. 2 is a block diagram of a system for creating and trading derivative investment instruments based on a volatility arbitrage benchmark index.

FIG. 2 is a block diagram of a system 200 for creating and trading derivative investment instruments based on a volatility arbitrage benchmark index. Generally, the system comprises a volatility arbitrage benchmark index module 202, a dissemination module 204 coupled with the volatility arbitrage benchmark index module 202, and a trading module 206 coupled with the dissemination module 204. Typically, each module 202, 204, 206 is also coupled to a communication network 208 coupled to various trading facilities 222 and liquidity providers 224.

The volatility arbitrage benchmark index module 202 comprises a communications interface 210, a processor 212 coupled with the communications interface 210, and a memory 214 coupled with the processor 212. Logic stored in the memory 214 is executed by the processor 212 such that that the volatility arbitrage benchmark index module 202 may receive a first set of trade information for each underlying asset representative of a desired group of underlying assets through the communications interface 210; aggregate that first set of trade information over a first time period, calculate a volatility arbitrage benchmark index for the desired group of underlying assets with the aggregated first set of trade information, and a standardized measure of the index; and pass the calculated values to the dissemination module 204.

The dissemination module 204 comprises a communications interface 216, a processor 218 coupled with the communications interface 216, and a memory 220 coupled with the processor 218. Logic stored in the memory 220 is executed by the processor 218 such that the dissemination module 204 may receive the calculated values from the volatility arbitrage benchmark index module 202 through the communications interface 216, and disseminate the calculated values over the communications network 208 to various market participants 222.

The trading module 206 comprises a communications interface 226, a processor 228 coupled with the communications interface 226, and a memory 230 coupled with the processor 228. Logic stored in the memory 230 is executed by the processor 228 such that the trading module 206 may receive buy or sell orders over the communications network 208, as described above, and pass the results of the buy or sell order to the dissemination module 204 to be disseminated over the communications network 208 to the market participants 222.

Figure 3:
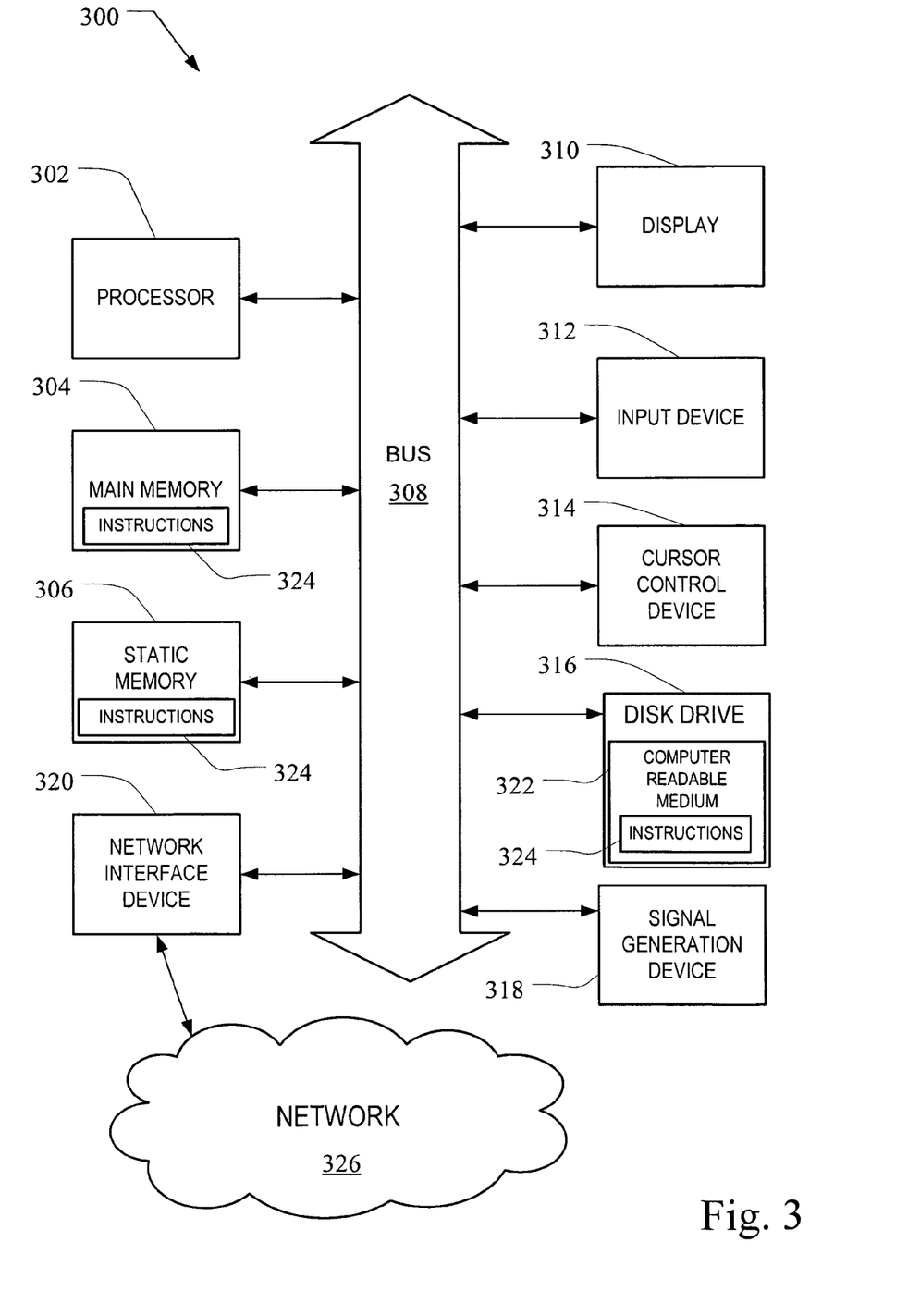
FIG. 3 is a block diagram of a general computing device and network connectivity.

Referring to FIG. 3, an illustrative embodiment of a general computer system that may be used for one or more of the components shown in FIG. 2, or in any other trading system configured to carry out the methods discussed above, is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306 that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used on financial exchanges, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As will be appreciated by those of ordinary skill in the art, mechanisms for creating a volatility arbitrage benchmark index, derivative investment instruments based thereon and other features described above may all be modified for application to other derivative investment instruments, such as futures, within the purview and scope of the present invention. An advantage of the disclosed methods and derivative investment instruments is that more traders at the exchange may have more opportunity to trade new products and obtain new and valuable market information, thus increasing visibility of orders and the desirability of maintaining a presence at the exchange.

The matter set forth in the foregoing description, accompanying drawings and claims is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A system for creating and trading derivatives based on a volatility arbitrage benchmark of an underlying asset, comprising:
    a volatility arbitrage benchmark index module comprising a first processor, a first memory coupled with the first processor, and a first communications interface coupled with a communications network, the first processor, and the first memory;
    a dissemination module coupled with the volatility arbitrage benchmark index module, the dissemination module comprising a second processor, a second memory coupled with the second processor, and a second communications interface coupled with the communications network, the second processor, and the second memory;
    a first set of logic, stored in the first memory and executable by the first processor to receive current values for an underlying asset of a volatility arbitrage benchmark derivative through the first communications interface, calculate a volatility arbitrage benchmark value for the underlying asset, pass the value for the calculated volatility arbitrage benchmark to the dissemination module, wherein the first set of logic is configured to cause the first processor to calculate the volatility arbitrage benchmark value according to a formula:

$$\text{Index}_t = \text{Index}_{t-1} \times \left[1 + \left(\frac{\sqrt{p_t} - \sqrt{p_{t-1}}}{\sqrt{p_{t-1}}}\right)\right]$$

wherein $\text{Index}_t$ is a closing index value for a first time period, $\text{Index}_{t-1}$ is a closing index value for a second time period, $p_t$ is a first time period closing price for a front-month derivative investment instrument; and $p_{t-1}$ is a second time period closing price for the front-month derivative investment instrument; and
    a second set of logic, stored in the second memory and executable by the second processor to receive the calculated volatility arbitrage benchmark value for the underlying asset from the volatility arbitrage benchmark index module; and disseminate the calculated volatility arbitrage benchmark value through the second communications interface to at least one market participant.

2. The system of claim 1, further comprising:
    a trading module coupled with the dissemination module, the trading module comprising a third processor, a third memory coupled with the third processor, and a third communications interface coupled with the communications network, the third processor, and the third memory;
    a third set of logic, stored in the third memory and executable by the third processor, to receive at least one buy or sell order over the communications network; execute the buy or sell order; and pass a result of the buy or sell order to the dissemination module; and
    a fourth set of logic, stored in the second memory and executable by the second processor to receive the result of the buy or sell order from the trading module and disseminate the result of the buy or sell order through the second communications network to the at least one market participant.

3. A system for creating and trading derivatives based on a volatility arbitrage benchmark of an underlying asset, comprising:
    a volatility arbitrage benchmark index module coupled with a communications network, the volatility arbitrage benchmark index module having a processor configured for receiving current values of an underlying asset of a derivative investment instrument and calculating a volatility arbitrage benchmark value of the underlying asset, wherein the processor is configured to calculate the volatility arbitrage benchmark value according to a formula:

$$\text{Index}_t = \text{Index}_{t-1} \times \left[1 + \left(\frac{\sqrt{p_t} - \sqrt{p_{t-1}}}{\sqrt{p_{t-1}}}\right)\right]$$

wherein $\text{Index}_t$ is a closing index value for a first time period, $\text{Index}_{t-1}$ is a closing index value for a second time period, $p_t$ is a first time period closing price for a front-month derivative investment instrument; and $p_{t-1}$ is a second time period closing price for the front-month derivative investment instrument; and a dissemination module coupled with the volatility arbitrage benchmark index module and the communications network for receiving the volatility arbitrage benchmark value of the underlying asset from the volatility arbitrage benchmark index module, and disseminating the volatility arbitrage benchmark value of the underlying asset to at least one market participant; and a trading module coupled with the dissemination module and the communications network for receiving at least one buy or sell order for the derivative investment instrument, and executing the at least one buy or sell order.

* * * * *

UNITED STATES PATENT AND TRADEMARK OFFICE
CERTIFICATE OF CORRECTION

PATENT NO.        : 8,140,425 B2                                   Page 1 of 1
APPLICATION NO.   : 11/875572
DATED             : March 20, 2012
INVENTOR(S)       : Hiatt, Jr.

It is certified that error appears in the above-identified patent and that said Letters Patent is hereby corrected as shown below:

On the Title Page

In the left column, item (60), after "Provisional application No." replace "60/859,619" with --60/858,619--.

Signed and Sealed this
Twenty-second Day of May, 2012

David J. Kappos
*Director of the United States Patent and Trademark Office*